Nov. 18, 1969 C. W. DAVID ET AL 3,479,222

APPARATUS FOR AND METHOD OF CLEANING MEMORY DISCS

Filed June 22, 1966 6 Sheets-Sheet 1

INVENTORS:
CHARLES W. DAVID
EUGENE A. MUNSON

By Smyth, Roston & Pavitt
ATTORNEYS

APPARATUS FOR AND METHOD OF CLEANING MEMORY DISCS

Filed June 22, 1966

INVENTORS:
CHARLES W. DAVID
EUGENE A. MUNSON
By Smyth, Roston & Pavitt
ATTORNEYS

APPARATUS FOR AND METHOD OF CLEANING MEMORY DISCS

Filed June 22, 1966

INVENTORS:
CHARLES W. DAVID
EUGENE A. MUNSON

By [signature]
ATTORNEYS

APPARATUS FOR AND METHOD OF CLEANING MEMORY DISCS

Filed June 22, 1966 6 Sheets-Sheet 4

INVENTORS:
CHARLES W. DAVID
EUGENE A. MUNSON

By Smyth, Roston & Pavitt
ATTORNEYS

APPARATUS FOR AND METHOD OF CLEANING MEMORY DISCS

Filed June 22, 1966 6 Sheets-Sheet 5

INVENTORS
CHARLES W. DAVID
EUGENE A. MUNSON
By Smyth, Roston & Pavitt
ATTORNEYS

APPARATUS FOR AND METHOD OF CLEANING MEMORY DISCS

INVENTORS:
CHARLES W. DAVID
EUGENE A. MUNSON
By Smyth, Roston & Pavitt
ATTORNEYS 3,479,222

APPARATUS FOR AND METHOD OF CLEANING MEMORY DISCS

Charles W. David, Marina del Rey, and Eugene A. Munson, Torrance, Calif., assignors, by mesne assignments, to Disc Pack Corporation, Hawthorne, Calif., a corporation of California Filed June 22, 1966, Ser. No. 559,611
Int. Cl. B08b 7/00, 11/00
U.S. Cl. 134—33 13 Claims

ABSTRACT OF THE DISCLOSURE

Cleaning apparatus and method particularly adapted for the cleaning of annular articles such as memory discs. The cleaning apparatus includes a housing having a cleaning chamber therein, mounting means for mounting a disc for rotation within the cleaning chamber, nozzle means for directing solvent against the faces of the disc, brushes for engaging the faces of the disc to clean them, and a second set of nozzles for directing a drying fluid against the disc faces.

This invention relates to an apparatus for, and a method of, cleaning memory discs.

As is well known, memory discs are thin annular metal members having a thin oxide coating on the faces thereof. Information is recorded on these discs by a recording head that "flies" over a laminar air film on the face of the disc.

If a memory disc is not completely free of dirt and other contaminants, the recording head cannot "fly" thereon, and the disc cannot be used for recording purposes. Surgical cleanliness is required. The discs must be handled with lint-free nylon gloves. Even small quantities of dirt, grease, oil, perspiration, or fine particulate matter prevents proper recording. Therefore, it is very important that the memory discs be thoroughly cleaned prior to attempting to record information thereon. It is also important that the memory discs be handled with care to prevent scratching or damaging of the oxide coating and to preclude contamination of the recording faces thereof.

One type of prior art cleaning method includes dipping the memory disc in a series of tanks filled with a solvent. This method is quite unsatisfactory in that it is slow, the cleaning of the disc is not as uniform and complete as is desired, and additional handling of the disc is required, thereby increasing the possibility of damaging the oxide coating and of contaminating the recording faces.

Another type of prior art cleaner holds the annular memory disc generally horizontally with a series of clamps which engage the faces of the disc along the inner periphery thereof. This cleaner utilizes a solvent for cleaning the disc, and after the disc has been as throughly cleaned as is possible with this machine, the disc is spun to evaporate the solvent. With this device the faces of the disc are cleaned sequetnially.

This type of cleaning device is rather slow in that only one face of the disc is cleaned at one time and the solvent is dried relatively slowly by spinning of the disc. This type of cleaning device is also unsatisfactory because it does not thoroughly and uniformly clean the disc. In addition, the portions of the disc which are covered by the clamps are not subjected to the cleaning action and therefore are not cleaned or are not thoroughly cleaned.

With the present invention, memory discs can be cleaned faster than has been possible heretofore in that both faces of the disc are simultaneously cleaned, excess handling of the discs is eliminated, operation of the cleaning device is completely automatic, and a drying fluid is supplied to the disc to speed up the drying portion of the cycle. As excess handling of the disc is eliminated, there is a correspondingly lesser possibility of damaging or contaminating the disc during the handling thereof. Furthermore, with the present invention the memory discs are cleaned more completely and more uniformly. This is made possible in part by the elimination of the clamps which have been necessary heretofore to mount the disc for cleaning. With the present invention the entire faces of the discs are exposed to the cleaning action and a very effective arrangement and movement of a cleaning mechanism is employed to thoroughly clean the disc. The recording faces of the memory disc are uncontacted by clamps or any other mounting members and therefore cannot be scratched or otherwise damaged by the mounting means.

The method of this invention includes supporting a memory disc, directing, as by spraying, a solvent such as alcohol against the memory disc so that the solvent contacts the faces thereof, and simultaneously scouring both of the faces of the memory disc. As the faces of the disc are scoured simultaneously, the disc is very rapidly cleaned. When the disc is cleaned, a stream of drying fluid, such as air, is directed against the disc to rapidly remove the solvent therefrom. The drying fluid blows some of the solvent from the disc and also increases the rate of evaporation thereof. To further increase the speed with which the disc is cleaned, all of the cleaning and drying steps are performed in response to the actuation of a single switch on a control panel.

To assure that the memory disc is thoroughly and uniformly cleaned, the memory disc is supported to expose all portions of the faces of the disc to thereby allow the scouring action to cover the entire faces of the disc. More particularly, the method of this invention includes supporting the disc along a portion of the periphery thereof and rotating or otherwise moving the disc relative to its support to expose all portions of the faces of the disc. Thus, even though the support may cover spaced portions along the periphery of the disc, such portions are sequentially exposed to cleaning action by virtue of the relative rotation between the disc and the support.

The apparatus of this invention includes a supporting structure, means for mounting the disc on the supporting structure, mechanical means engageable with both of the faces of the disc for substantially simultaneously cleaning the faces thereof, and motor means for causing relative movement between the disc and the mechanical means. The mechanical means may preferably include brushes, but may include pads or other scouring means, and preferably engages both faces of the disc simultaneously to provide rapid cleaning thereof.

In one preferred form, the mounting means mounts the disc for rotation about a rotational axis and a motor rotates the disc about such axis. Each of the brushes is generally cylindrical with the longitudinal axis thereof being generally transverse the rotational axis of the disc, and drive means are provided to rotate the brushes about their respective longitudinal axes.

To improve the cleaning action, solvent nozzles direct a solvent against the disc and preferably against the faces thereof. The solvent acts to loosen, dissolve and wash away the contaminants adhering to the faces of the disc. The rubbing or abrasive action of the brushes against the faces of the disc provide a mechanical cleaning action which thoroughly and rapidly cleans the disc.

When the disc has been cleaned, a set of drying nozzles directs a drying fluid against the faces of the disc to blow and evaporate the solvent from the faces of the disc. The disc may be rotated during the period of operation of the drying nozzles to provide a centrifugal drying action. To prevent the brushes, which will usually retain some of the solvent, from releasing such solvent onto the disc during the drying cycle, means are provided for retracting the brushes from the disc just prior to the drying operation.

The disc may be mounted in a plane which is inclined from the horizontal and is preferably mounted in a vertical plane. With the disc supported in a generally vertical plane, the solvent and the contaminants thereon more readily fall or drip from the disc.

To preclude the possibility of the mounting means causing damage to the recording faces of the disc, it is preferred that such mounting means not contact the recording faces of the disc. This may be accomplished by providing a plurality of mounting members, each of which have a generally V-shaped groove for receiving a portion of the peripheral edge of the disc. By providing the mounting members in appropriate spaced relation around the periphery of the disc, the disc can be firmly frictionally retained. The V-shaped grooves engage the peripheral edge and the peripheral corners of the disc, but preferably do not engage the recording faces, and therefore can cause no damage thereto.

The V-shaped grooves of the mounting members will, however, overlie in spaced relationship thereto small portions of the recording faces. In order to thoroughly clean these portions of the disc, it is necessary or desirable that these portions be contacted by the solvent and engaged by the brushes or other mechanimal cleaning means. According to the present invention, this function is accomplished by providing drive means which move the disc relative to the mounting members, so that the entire faces of the disc can be completely cleaned.

More particularly, each of the mounting members may include a roller having the V-shaped groove thereon. The rollers mount the disc for rotation. By rotating the disc, the portions thereof which were initially within the V-shaped grooves are sequentially rotated to a position in which solvent is sprayed thereon and the brushes come in contact therewith. In this manner the entire faces of the disc are thoroughly and uniformly cleaned. For simplicity, it is preferred to utilize one of the rollers as a drive roller for imparting rotation of the disc.

To allow the disc to be removed from the mounting members after it has been cleaned, at least one of the rollers is movable into and out of engagement with the peripheral edge of the disc. This roller is movable by an air cylinder which causes the roller to engage the disc and apply a limited predetermined force thereto. This force is sufficient to cause the disc to be firmly held by the rollers and to allow one of the rollers to drive the disc.

It is preferred to enclose all of the components of the cleaning apparatus within a housing. The housing provides a cleaning chamber, an equipment chamber, and an opening providing access to the cleaning chamber from the exterior of the housing. The rollers, brushes, solvent, nozzles and drying nozzles are all appropriately mounted within the cleaning chamber. The actuators for extending and retracting the brushes and the retractable roller are mounted within the equipment chamber. The brushes and the motor for rotating the brushes are preferably mounted on a carriage which is within the equipment chamber. The carriage is slidable along a pair of tracks mounted within the equipment chamber to cause the brushes to be extended into engagement with the disc and to be retracted therefrom.

After the solvent has been sprayed directly against the disc, it is returned to a reservoir within the equipment chamber. The solvent is then filtered and recycled through the solvent nozzles.

A door is provided for opening and closing the opening that provides communication between the interior of the cleaning chamber and the exterior of the housing. A pair of U-shaped tracks are secured to opposed edges of the opening so that they open inwardly toward the center of the opening. A door having a plurality of rollers affixed thereto is disposed between the tracks with the rollers in rolling engagement with the tracks. Elongated sealing strips, preferably of Teflon, sealingly engage the confronting edges of the tracks and the door. These strips perform the important function of tightly sealing the cleaning chamber to prevent entry of contaminants therein and to prevent egress of the solvent.

A portion of the lower side of the door forms a rack which meshes with a pinion mounted therebelow. An automatically controlled motor drives the door through the pinion and rack between the open and closed positions.

To further improve the speed and efficiency of the device, all of the above-noted functions are preferably accomplished automatically by an electrical control circuit. Thus, a disc is manually inserted through the opening in the cleaning chamber and placed into engagement with some of the mounting rollers therein. The operator then pushes a button and in response thereto all of the other functions of the device are performed automatically. When the disc is completely cleaned and dry, the door of the cleaning chamber opens automatically and the cleaned disc is manually removed therefrom. The automatic functions of the machine are performed in approximately 55 seconds.

More particularly, when the disc is inserted into the cleaning chamber, the retractable roller and the brushes are in their retracted positions. When the operator depresses the "start" or automatic cycle button, the door closes automatically and the retractable roller advances to engage the disc and applies a limited predetermined force thereto. A preferred sequence of automatic operation is as follows: the brushes extend into engagement with the disc; the driving roller begins to rotate the disc; the motor that rotates the brushes is started; solvent flow through the solvent nozzles begins; an electrical timer starts for measuring the predetermined work cycle; the brushes are retracted from the disc; solvent flow through the nozzles is stopped; a drying fluid is supplied through the drying nozzles; after a predetermined period the disc drive stops and the flow of drying fluid through the disc is also stopped; the retractable roller is retracted; and the door is moved to the "open" position. The part is then manually unloaded from the cleaning chamber.

The invention, both as to its organization and method of operation, together with further features and advantages thereof may best be understood by reference to the following description taken in connection with the accompanying illustrative drawings, in which.

Figures 1, 2, 3:
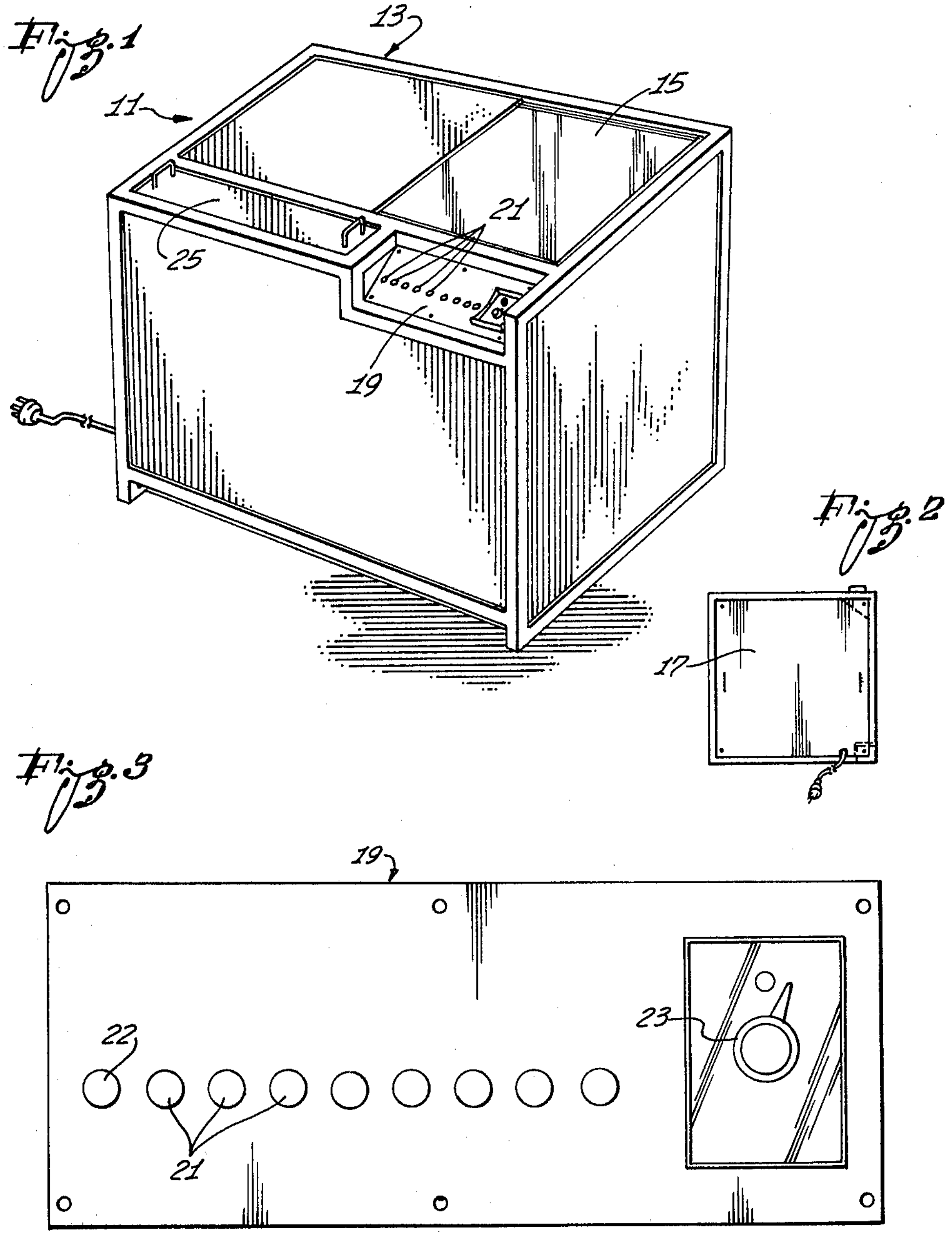
FIG. 1 is a perspective view of a cleaning apparatus for memory discs constructed in accordance with the teachings of this invention.
FIG. 2 is an elevational view of an access panel for the cleaning apparatus.
FIG. 3 is an enlarged elevational view of the control panel for the cleaning apparatus.

Referring to the drawings, and in particular to FIGS. 1–3, reference numeral 11 designates a cleaning apparatus constructed in accordance with the teachings of this invention. The cleaning apparatus includes a housing 13 having a door 15 in the upper side thereof for providing access to the interior of the housing. The door 15 is preferably constructed of a transparent material, such as glass, and is movable in the plane of the upper side of the housing 13 to provide access to the interior thereof.

The left side of the housing 13 (as viewed in FIG. 1) has an access panel 17 which is openable to provide access to the various items of equipment within the housing 13. A control panel 19 is disposed at an angle at the upper forward corner of the housing 13. The control panel 19 has a plurality of indicator lights 21 for designating which portion of the automatic cycle of the cleaning apparatus 11 is being performed. An automatic start button 22 is provided at one end of the panel 19 for initiating automatic operation of the cleaning apparatus 11. A dial 23 is located at the right end of the control panel 19. A removable cover 25 is located at the left end of the top surface of the housing adjacent the forward corner thereof. Removal of the cover 25 provides access to a series of buttons (not shown) which permit manual control of the cleaning operation 11. Manual control is used only during setup of the cleaning apparatus and, accordingly, the cover 25 will normaly be locked in place.

With reference to FIGS. 4–7, it can be seen that the housing 13 contains a cleaning chamber 27 and the remainder of the volume within the housing 13 defines an equipment chamber 29. The cleaning chamber 27 is a tightly sealed rectangular box having an open upper end which is positioned immediately beneath the door 15 when the later is in the closed position. Thus, the door 15 cooperates with the cleaning chamber 27 to seal the later against the ingress of contaminants and to prevent egress of the solvent therefrom. The equipment chamber 29 is generally L-shaped, with the long leg of the L lying partially beneath the cleaning chamber 27.

Figure 4:
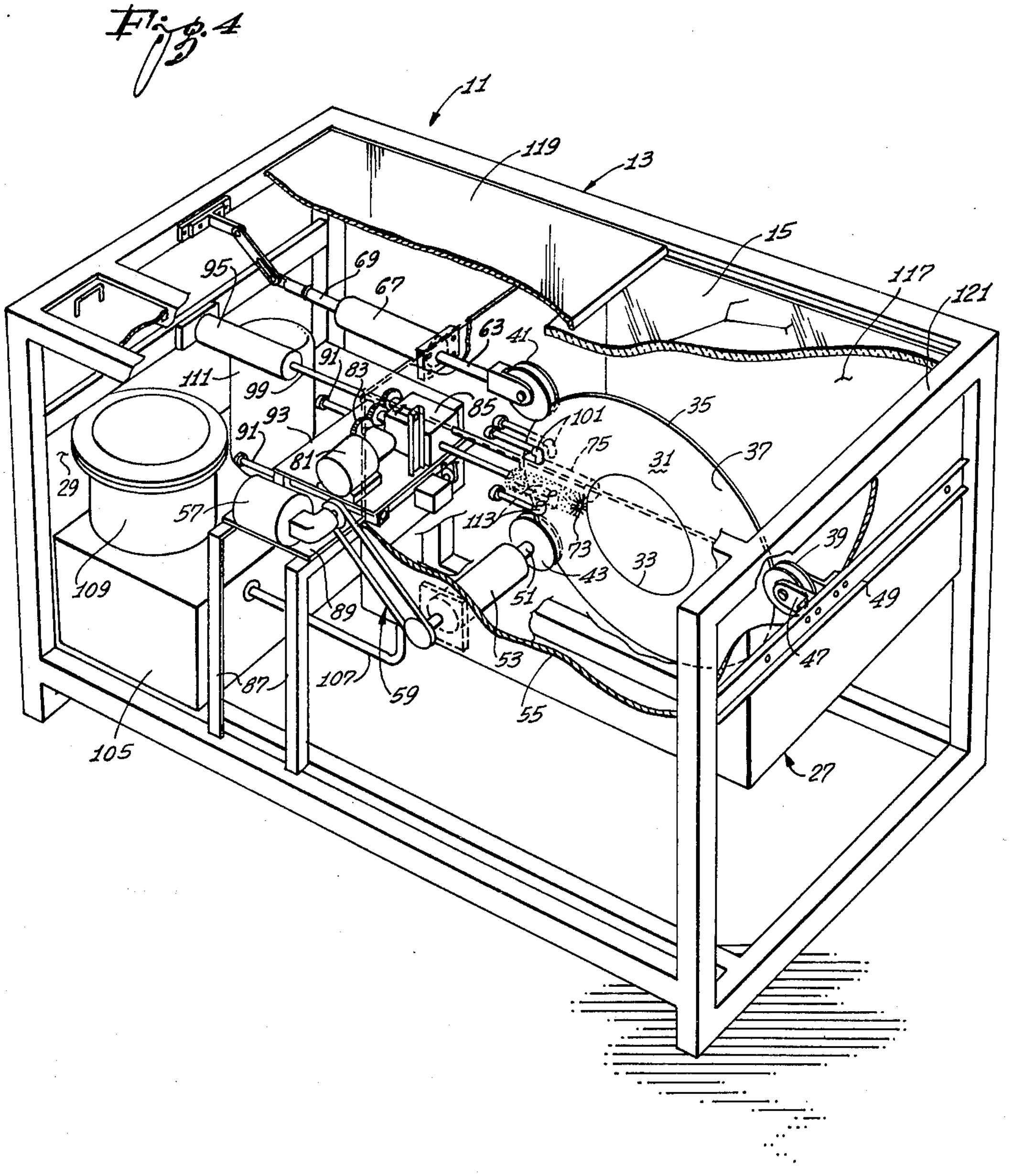
FIG. 4 is an enlarged perspective view of the cleaning apparatus with the portions thereof broken away to expose the interior of the apparatus.

As best seen in FIG. 4, the cleaning apparatus 11 is designed to thoroughly clean a memory disc 31. The disc 31 is an annular metal member having inner and outer peripheral edges 33 and 35, respectively, and opposed recording faces 37. The recording faces 37 of the disc 31 comprises magnetic oxide coatings and must be surgically clean. The faces 37 of the disc are accordingly quite delicate and a precision machine is required for automatically cleaning them.

It is important that the disc 31 be mounted within the cleaning chamber 27 so that all portions thereof and in particular all portions of the faces 37 can be subjected to thorough cleaning action. It is, therefore, undesirable to utilize a clamp which will by itself firmly grip a portion of the disc because in this instance the portion of the disc so gripped cannot be cleaned and provides for retention of the various disc contaminants.

Figure 5:
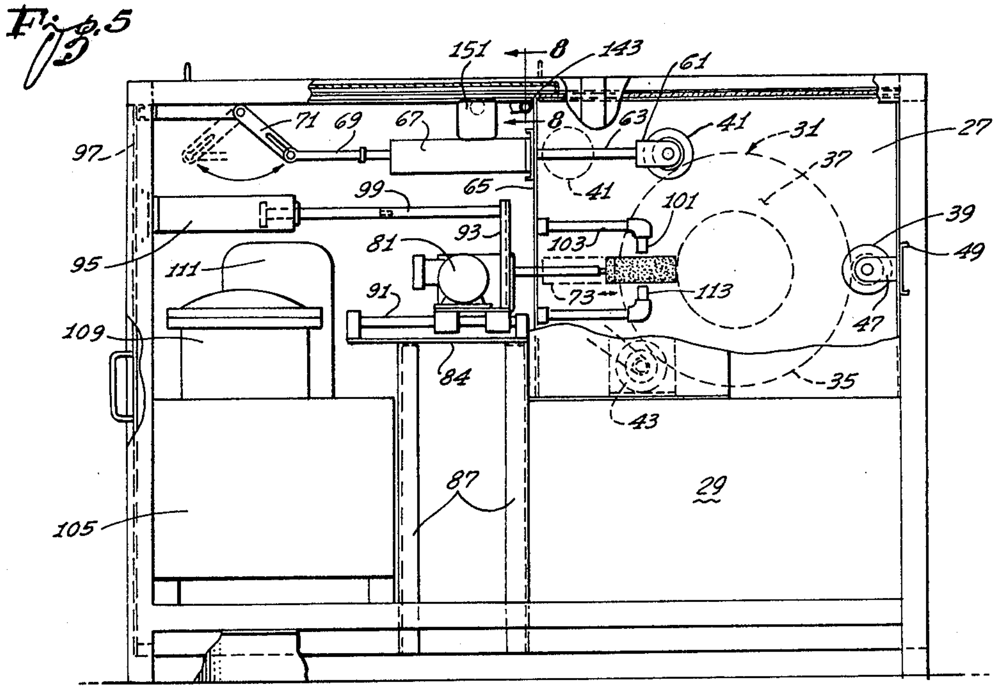
FIG. 5 is a front elevational view of the cleaning apparatus with portions thereof broken away to expose the rollers and brushes.

According to the present invention, the disc 31 is mounted by an idler roller 39, a reciprocable clamping or idler roller 41, and a drive roller 43 (FIGS. 4 and 5). Although any number of the rollers that will safely and rigidly mount the disc 31 can be employed, three rollers spaces 120 degrees apart as illustrated in the drawings are considered very satisfactory.

Figure 6:
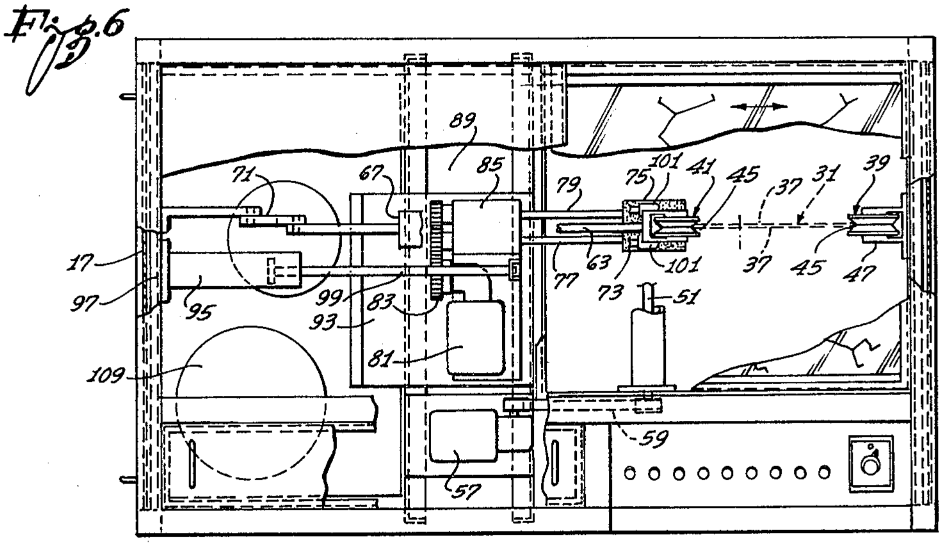
FIG. 6 is a top plan view of the cleaning apparatus with parts thereof broken away.

As best seen in FIG. 6, each of the rollers 39, 41, and 43 has a circumferentially extending V-shaped groove 45 which engages the outer peripheral edge 35 of the disc. As shown in FIGS. 4–7, the V-shaped groove extends outwardly from the center of its respective roller and overlies a small portion of the faces 37 in spaced relationship thereto. The included angle of the V-shaped groove 45 is preferably about 60 degrees. Thus, the V-shaped grooves 45 prevent axial movement of the disc 31 relative to the rollers. It should also be noted that it is only necessary for the rollers 39, 41, and 43 to engage the peripheral edge 35 of the disc and they need not engage any portion of the faces 37, thereby substantially reducing the possibility of scratching these faces.

All of the rollers and the disc 31 are mounted for rotation about parallel horizontal axes. As shown in FIGS. 4–6, the roller 39 is mounted for rotation about a horizontal axis by a bracket 47 which is secured to a frame member 49 of the housing.

The drive roller 43 is mounted for rotation with a drive shaft 51 which is rotatably mounted in a bearing 53 which is secured to a front wall 55 of the cleaning chamber 27. The shaft 51 projects forwardly through the front wall 55 where it is driven by an electric disc drive motor 57 through a belt and pulley drive 59. Thus, the disc 31 is driven in rotation about its axis by the drive roller 43 which engages the outer peripheral edge 35. There is, therefore, no need for a rigid or clamping type connection between the disc 31 and the driving member.

The clamping roller 41 is movable between an extended position in which it engages the peripheral edge 35 of the disc and a retracted position shown in phantom in FIG. 5. The clamping roller 41 is rotatably mounted by a U-shaped bracket 61 which is supported by an actuator rod 63. The actuator rod 63 extends through a side wall 65 of the cleaning chamber 27 and into a fluid actuator 67 which is suitably mounted to the side wall 65. A rod 69 protrudes from the other end of the actuator 67 and is pivotally secured to a pivotally mounted slotted link 71. The fluid actuator 67 may be appropriately connected to a fluid control system (not shown) which will cause reciprocable movement of the clamping roller 41 between the two positions illustrated in FIG. 5.

The clamping roller 41 will be in the retracted position to allow insertion of the disc 31 into the cleaning chamber 27 and into engagement with the rollers 39 and 43. The clamping roller 41 is then automatically extended into engagement with the disc 31 to clamp the latter firmly in the vertical position illustrated. The fluid actuator 67 and the control therefor are so arranged that the clamping roller will apply a limited predetermined force to the disc 31. For example, the pressure of the motive fluid admitted to the actuator 67 may be appropriately automatically limited to cause a limited force to be applied to the disc 31. This force is sufficient to firmly clamp the disc 31 in position without causing damage thereto.

With the disc 31 supported by the three rollers, small portions of the faces 37 of the disc are covered by the portions of the rollers forming the V-shaped grooves 45. However, by rotating the disc 31 about its axis relative to the rollers 39, 41, and 43, these covered portions of the disc faces are moved so that they can directly receive the full cleaning action within the cleaning chamber 27. This permits the entire faces 37 of the disc 31 to be thoroughly and completely cleaned.

Mechanical means engageable with both of the faces 37 of the disc 31 are provided for simultaneously cleaning both faces of the disc. In the embodiment illustrated, such means includes two generally cylindrical brushes 73 and 75 mounted for rotation about their longitudinal axes by a pair of shafts 77 and 79, respectively. The two brushes 73 and 75 are engageable simultaneously with the faces 37 of the disc to provide a thorough mechanical or abrasive cleaning action. The longitudinal axes of the brushes preferably extend radially of the disc 31 parallel to the plane thereof, and parallel to each other. The brushes are preferably sufficiently long to completely cover the entire radial dimension of the disc as illustrated in FIG. 5. It is important that the brushes 73 and 75 be completely lint-free and also that they do not scratch the faces 37.

Although the brushes 73 and 75 are preferred, it may be possible to use other types of mechanical cleaning members which apply a thorough, gentle scouring action to the faces 37. It is apparent that by rotating the disc 31 on its supporting rollers, the brushes 73 and 75 will contact every point on the two faces 37, thereby scouring every point on the faces. It is important that at least two of the brushes are provided because this permits the faces 37 to be simultaneously cleaned.

The brushes 73 and 75 are rotated by an electric brush motor drive 81 which is drivingly interconnected to the shafts 77 and 79 by a gear train 83. As shown in FIGS. 4 and 6, the shafts 77 and 79 are mounted in a suitable bearing 85. The motor 81 and the gear train 83 function to rotate the brushes 73 and 75 so that the portions thereof in engagement with the disc 31 are moving downwardly. This tends to sweep the material which is removed from the discs downwardly toward the bottom of the cleaning chamber 27.

The motors 57 and 81 are mounted in the equipment chamber on a table-like structure which includes a pair of U-shaped frame members 87 and a plate 89 (FIGS. 4–6). The plate 89 serves as a mounting plate for the motor 57.

As is more fully explained hereinbelow, a solvent is sprayed onto the disc 31 during the scouring of the disc, following which the disc 31 is dried. The brushes 73 and 75 will retain at least some solvent during the washing operation; and to prevent them from releasing this solvent onto the drying disc, it is preferred to retract them to the position shown in phantom in FIG. 5. Retracting of the brushes also facilitates placement and removal of the disc 31 in the cleaning chamber 27.

The brush retraction or reciprocation means includes a pair of parallel tracks or rails 91 attached to the plate 89. A carriage 93 which carries the motor 81, the gear train 83, and the bearing 85, is mounted on the tracks 91 for movement therealong. The carriage 93 is moved along the tracks 91 by a fluid operated piston-cylinder actuator 95 which is mounted on a side wall 97 of the housing 13. A push rod 99 interconnects the actuator 95 with an up-standing portion of the carriage 93 to allow the actuator to move the carriage along the tracks 91. The actuator 95 is connected to a suitable fluid control system (not shown) which imparts the desired movement to the push rod 99. Thus, by retracting the carriage 93, the brushes 73 and 75 are also retracted.

Figure 7:
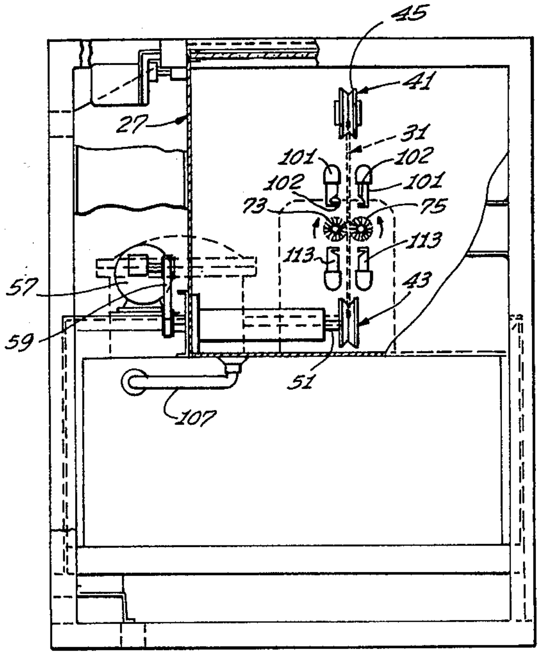
FIG. 7 is a side elevational view of the cleaning apparatus with parts thereof broken away.

A pair of opposed solvent nozzles 101 are provided immediately about the brushes 73 and 75, one on each side of the disc 31 for spraying a solvent, such as alcohol, against the faces 37. As shown in FIG. 7, each of the nozzles 101 include a laterally directed orifice 102 which directs the solvent generally perpendicularly against the adjacent face 37. As shown in FIG. 5, the nozzles 101 are positioned intermediate the inner peripheral edge 33 and the outer peripheral edge 35. The nozzles are secured to suitable rigid conduits 103 (FIG. 5) which extend toward the side wall 65 of the cleaning chamber 27.

A solvent reservoir 105 is provided in the equipment chamber 29. The reservoir 105 receives solvent through a gravity return line 107 which leads from the bottom of the cleaning chamber 27 to the reservoir (FIG. 4). The solvent is forced by a pump 109 through a filter 111 and a conduit system (not shown) to the conduits 103 and the nozzles 101. The solvent is sprayed through the orifices 102 onto the disc 31 to dissolve and otherwise assist in removing contaminants therefrom. The solvent then falls to the bottom of the cleaning chamber 27 and returns to the reservoir 105 through the return line 107.

When the disc 31 has been thoroughly scoured, three functions in addition to the stopping of the solvent flow are performed to assist drying of the disc. First, the brushes 73 and 75 are retracted, as described above, so that any solvent retained thereby will not be released onto the faces of the disc. Secondaly, the disc 31 continues to be rotated by the drive roller 43. Third, a pair of drying nozzles 113 are provided for directing a drying fluid such as air perpendicularly against the faces of the disc. The nozzles 113 are positioned below the brushes 73 and 75, respectively, and they are opposed to simultaneously blow air against the faces of the disc. As the disc 31 is rotating, all portions thereof eventually are directly contacted by the drying air from the nozzles 113. The air from the nozzles 113 not only speeds evaporation of the alcohol, but also blows some of the solvent from the disc. Of course, an appropriate vent opening (not shown) may be provided in the cleaning chamber 27 to limit overpressurization thereof, if necessary.

Although other orientations of the disc 31 are possible, it is preferred to position the disc vertically within the cleaning chamber 37. This allows the solvent to flow by gravity along the disc and wash the contaminants therefrom, thereby facilitating a very thorough cleaning of the disc. The vertical disc also dries more quickly than if the disc were positioned horizontally.

Figure 8:
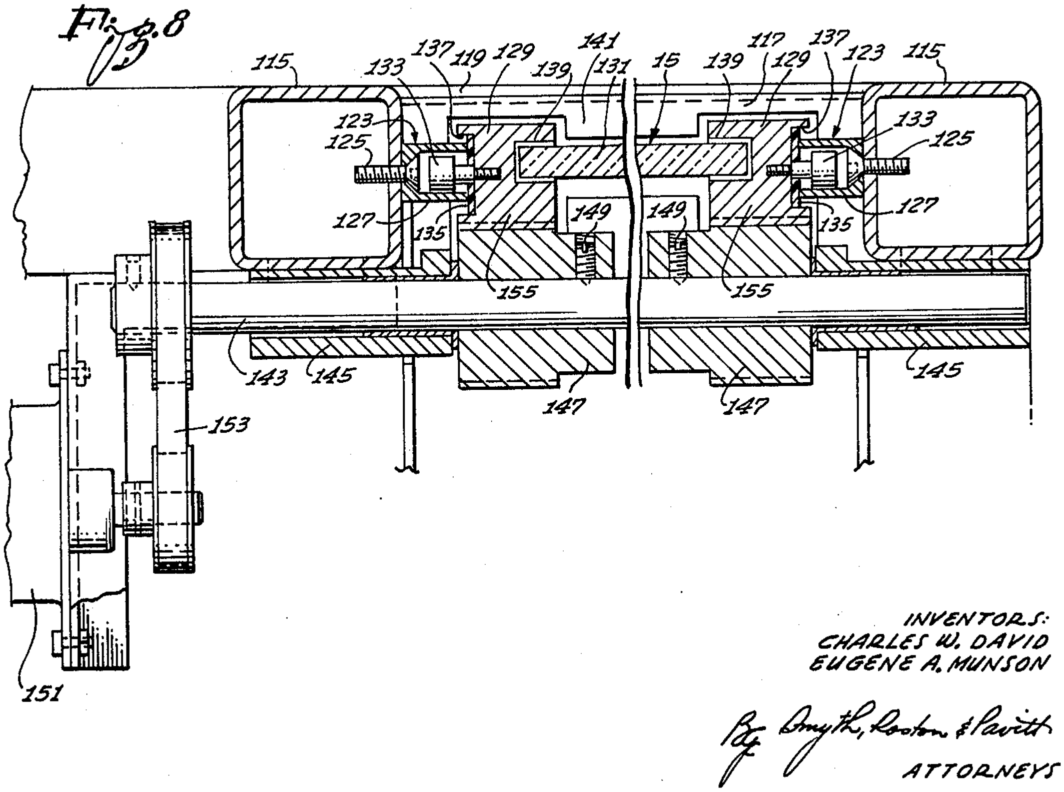
FIG. 8 is an enlarged sectional view taken along line 8—8 of FIG. 5 and illustrating the door that seals off the cleaning chamber.

The details of construction of the door 15 and the operator therefor are illustrated in FIG. 8. A pair of opposed tubular members 115 having a generally square cross-section lie along the upper surface of the housing and define therebetween an opening 117 which, when uncovered, provides access to the interior of the cleaning chamber 27. As shown in FIG. 4, the other ends of the opening 117 are defined by a rigid cover plate 119 and a structural member 121 at the corner of the housing.

A pair of tracks 123 are secured respectively to the members 115, as by threaded fasteners 125 and lie along opposed edges of the opening 117. The tracks 123 are generally U-shaped in transverse cross section and open inwardly toward the center of the opening 117. Each of the tracks 123 has a lower supporting leg 127.

The door 15 includes a pair of opposed longitudinally extending frame members 129 supporting a door member 131 of glass or other transparent material therebetween. Each of the door members 131 has a plurality of outwardly extending rollers 133 mounted thereon for rotation relative thereto. The rollers 133 rest and roll on the legs 127 of the tracks 123.

To tightly seal the inner face between the tracks 123 and the frame members 129, elongated sealing strips 135, preferably of Teflon, are secured to the outer edges of the frame members. Preferably, the sealing strips 135 are retained in cutout portions 137 of the frame members 129 as shown. Similarly, channel-shaped sealing members 139 may be utilized to seal the inner faces between the door member 131 and the frame members 129.

Thus, the door 15 may be moved to open or close the opening 117. Portions of the housing, such as a structural member 141, may be appropriately notched to allow the door 15 to pass thereunder as illustrated in FIG. 8. When the door is closed, the sealing strips 135 and the sealing members 139 tightly close the various interfaces, while the transparent door member 131 allows the operator to view the cleaning action.

In the illustrated form of the invention, the door 15 is automatically actuated. Thus, a drive shaft 143 is rotatably mounted in a pair of bearings 145, and a pair of pinions 147 are suitably secured to the drive shaft as by set screws 149. The pinions 147 are driven by an electrical door or cover drive motor 151 and a belt drive 153. As shown in FIG. 5, the motor 151 and the shaft 143 are located closely adjacent the upper edge of the side wall 65 of the cleaning chamber 27.

The lower sides of the frame members 129 of the door 15 provide racks 155 which mesh with the pinions 147. Thus, power is transmitted from the motor 151 through the belt drive 153, the shaft 143, the pinions 147, and the racks 155 to the door 15.

One of the features of this invention is that the disc 31 can be rapidly cleaned. Approximately fifty-five seconds is all the time that is required to thoroughly clean a disc. One aspect of this invention that contributes to the speed of cleaning is that all of the operations except loading a disc into the cleaning chamber and removing it therefrom can be performed completely automatically. In some instances, it may be possible to provide several cleaning stations within a single cleaning chamber to enable several of the discs to be simultaneously cleaned.

In a preferred sequence of operation, the clamping roller 41 and the brushes 73 and 75 are all in their retracted positions and the door 15 is open. The disc 31 is manually inserted through the opening 117 into engagement with the idler roller 39 and the drive roller 43 where it is retained. The operator then pushes the automatic start button 22 and the motor 151 is energized to automatically close the door 15. The clamping roller 41 is automatically advanced to apply a limited predetermined force against the outer peripheral edge 35 of the disc to clamp the disc 31 firmly in position. The brushes 73 and 75 advance and the motor 81 is energized to rotate the brushes and then solvent flow is initiated through the nozzles 101. Next, the motor 57 is started to drive the disc 31 and all parts of the disc are thoroughly cleaned, with both of the faces 37 being simultaneously scoured. After a predetermined period of time and when the disc is thoroughly cleaned, the brushes 73 and 75 automatically retract and cease to rotate and a short while later, the solvent flow stops. With the disc 31 still rotating, air is supplied through the nozzles 113 until the disc is dry, at which time the motor 57 which drives the disc is stopped, the air flow through the nozzles 113 is stopped, the clamping roller 41 retracts, and the door 15 opens. The disc 31 is then manually removed from the cleaning chamber.

Figure 9:
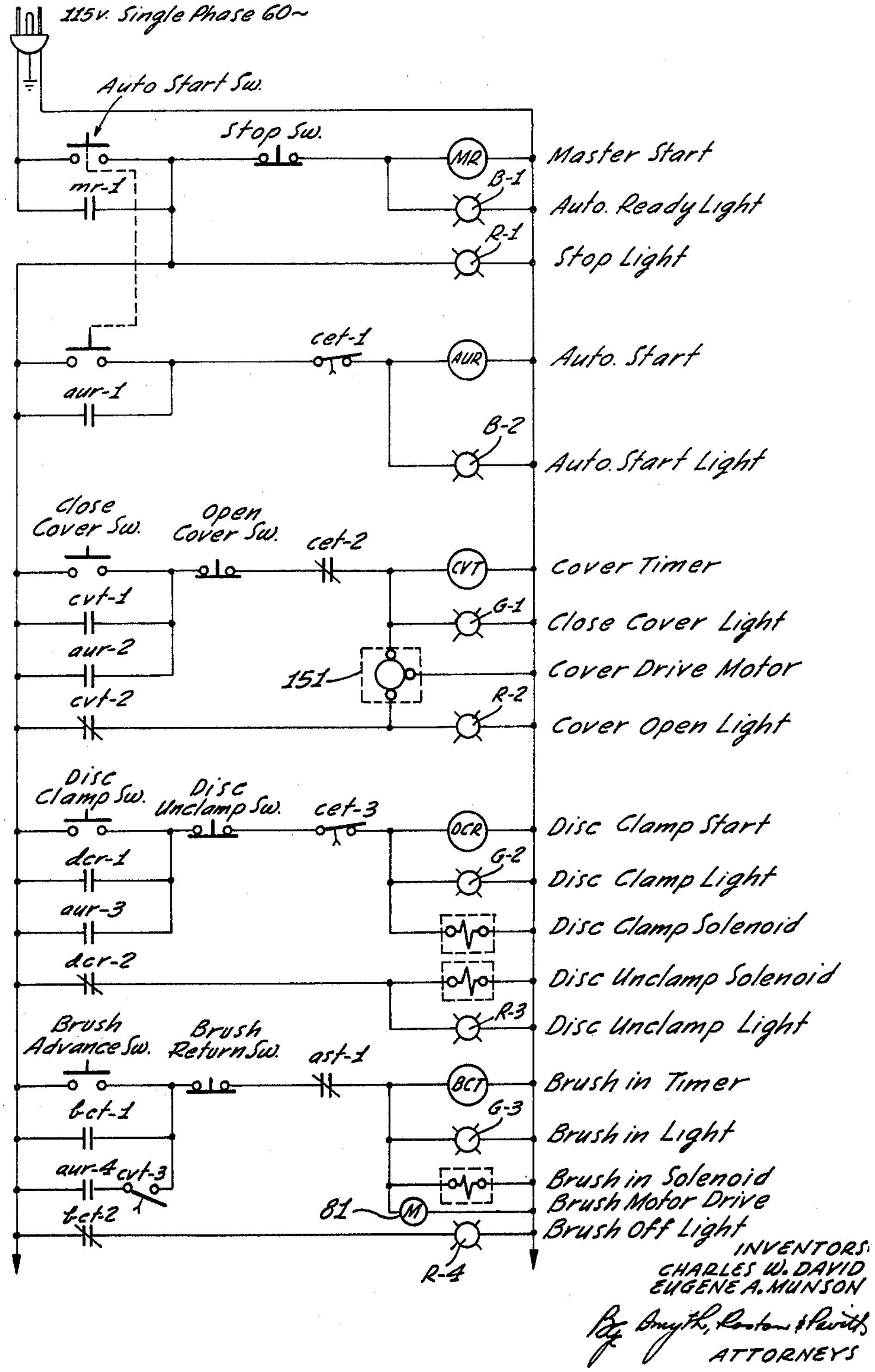
FIGS. 9 and 10 are schematic wiring diagrams of the electrical controls of the cleaning apparatus.
Figure 10:
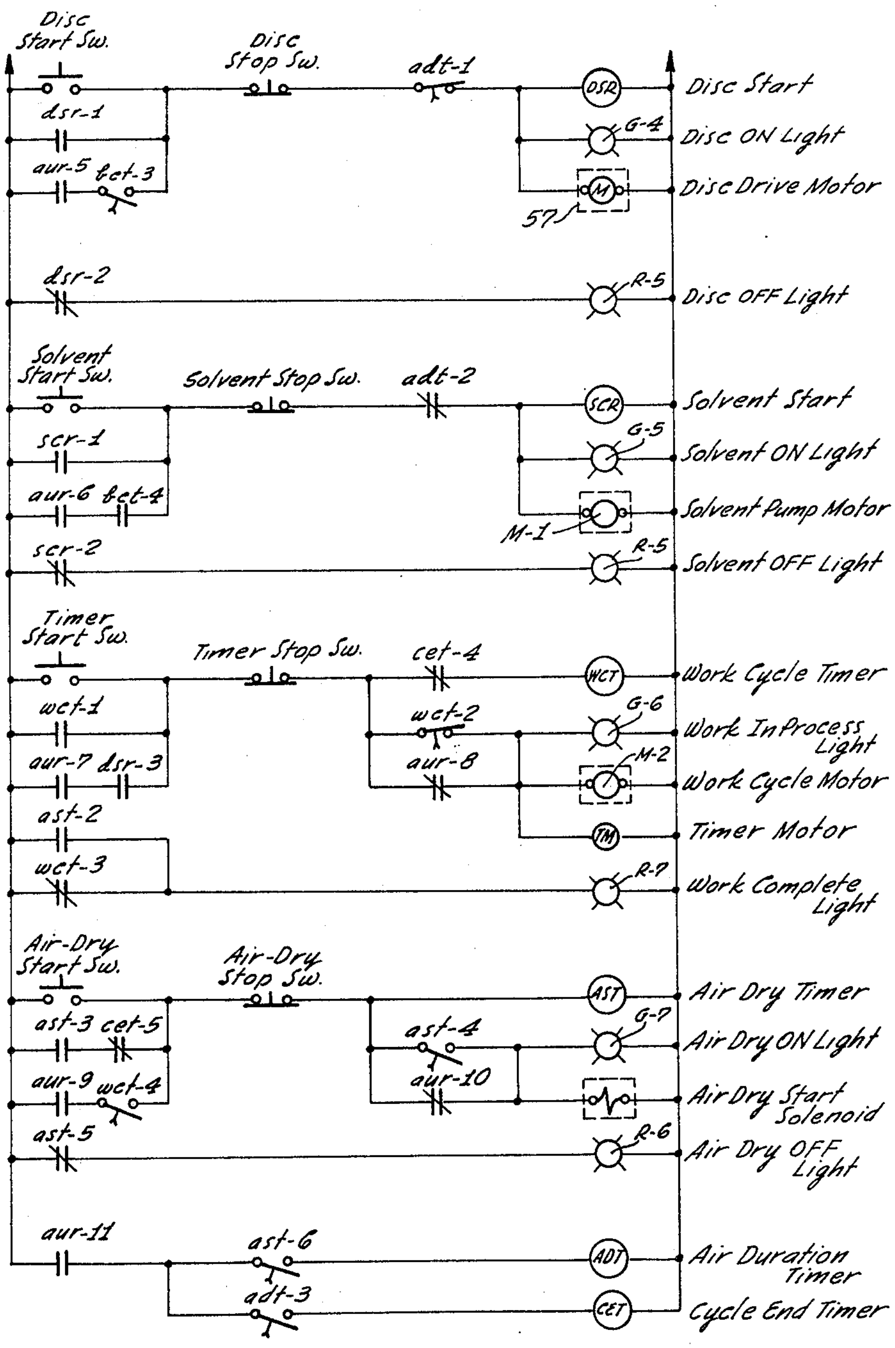

By way of illustration, the electrical controls illustrated diagrammatically in FIGS. 9 and 10 may be utilized to cause the cleaning apparatus 11 to function in the manner described above. The various relays in FIGS. 9 and 10 are illustrated in their de-energized condition.

As shown in FIG. 9, closing of the automatic start switch energizes a master start relay MR and an automatic ready light B–1 through a normally closed manually operated stop switch. The stop switch which is located on the control panel 19 provides for manual de-energizing of the relay MR. Energization of the master start relay MR closes the normally open contacts *mr*–1 to provide a holding circuit for the relay MR and to energize a stop light R–1, which is one of the indicator lights 21 on the control panel 19 (FIG. 1), as are all of the lights shown in FIGS. 9 and 10. Manual closing of the automatic start switch also energizes an automatic start relay AUR and an automatic start light B–2 through normally closed contacts *cet*–1 of a cycle end timer CET (FIG. 10). Closure of the normally open contacts *aur*–1 provides a holding circuit for the relay AUR.

Normally, the motor 151 is energized through contacts *cvt*–2 to keep the door 15 open. Closure of the normally open contacts *aur*–2 energizes a cover timer CVT, a close cover light G–1 and the cover drive motor 151 through an open cover switch and a pair of normally closed contacts *cet*–2. The manually operated open cover switch and a close cover switch provide means for manually operating the cover drive motor 151. A holding circuit for the cover timer CVT and the cover drive motor is provided through a pair of normally open contacts *cvt*–1. The cover open light R–2 is on when the timer CVT is de-energized. Energization of the motor 151 through the contacts *cet*–2 causes the door 15 to close.

Similarly, closure of the normanlly open contacts *aur*–3 energizes a disc clamp start relay DCR, a disc clamp light G–2 and a disc clamp solenoid through a normally closed disc unclamp switch and a normally closed pair of contacts *cet*–3. The disc unclamp switch and a disc clamp switch allow manual operation of the disc clamp solenoid. A pair of normally open contacts *dcr*–1 close with the energization of the relay DCR to provide a holding circuit for the disc clamp start relay DCR. Simultaneously, a pair of normally closed contacts *dcr*–2 open to de-energize a disc unclamp solenoid and a disc unclamp light R–3. Energization of the disc clamp solenoid causes fluid to be admitted to the fluid actuator 67 to cause the clamping roller 41 to advance into engagement with the outer peripheral edge 35 of the disc 31.

A brush in timer BCT, a brush in light G–3, a brush in solenoid, and the brush motor drive 81 are energized through the contacts *aur*–4, contacts *cvt*–3, a manually operable brush return switch, and contacts *ast*–1. The brush in solenoid may actuate a valve or other suitable means to provide fluid under pressure to the actuator 95 to cause the brushes 73 and 75 to advance toward the disc 31. The contacts *cvt*–3 provide a delayed closure of this circuit to assure that the brushes 73 and 75 will not engage the disc 31 prior to the time that the disc is securely clamped in place by the clamping roller 41. The motor 81 causes the brushes 73 and 75 to rotate as described above. The normally closed contacts *bct*–2 are opened by the energization of the timer BCT to turn off the brush off light R–4.

Referring to FIG. 10, a disc start relay DSR, a disc on light G–4, and the disc drive motor 57 are energized through normally open contacts *aur*–5 and *bct*–3, a disc stop switch, and normally closed contacts *adt*–1. The closure of contacts *bct*–3 is delayed slightly following the energization of the relay BCT so that the motor 57 is started after the motor 81. Contacts *dsr*–1 provide a holding circuit for the disc start relay DSR and a disc start switch and the disc stop switch provide for manual operation of the disc drive motor 57. The contacts *dsr*–2 open to de-energize a disc off light R–5.

A solvent start relay SCR, a solvent on light G–5, and a solvent pump motor M–1 for the pump 109 are energized through contacts *aur*–6, *bct*–4, and *adt*–2, and a solvent stop switch. Because the contacts *bct*–3 delay the energization of the disc drive motor 57, the pump 109 will have been started, and if a sufficient period of delay is provided, solvent will be flowing through the nozzles 101 onto the disc before the disc drive motor 57 starts. Contacts *scr*–1 provide a holding circuit for the solvent start relay SCR, and a solvent start switch and the solvent stop switch provide for manual control of the solvent pump motor. A solvent off light R–5 is turned off by the contacts *scr*–2 upon energization of the relay SCR.

Closure of contacts *aur*–7 and *dsr*–3 energizes a work cycle timer WCT through normally closed contacts *cet*–4 and completes a circuit to a work in progress light G–6, a work cycle motor M–2, and a timer motor TM through a pair of normally closed contacts *wct*–2. Normally closed contacts *aur*–8 also provide a connection to the light G–6, the work cycle motor, and the timer motor TM. The contacts *aur*–8 have no effect on the automatic operation of the device, but permit manual operation independently of the work cycle timer WCT.

After a predetermined period of time established by the work cycle timer WCT, the contacts *wct*–4 close to energize an air dry timer AST through contacts *aur*–9. After a predetermined delay period during which the disc is rinsed by the solvent, the contacts *ast*–4 close to energize an air dry start solenoid which operates appropriate means, such as a valve, to supply air through the nozzles 113 to facilitate the drying of the disc. A holding circuit is provided through the contacts *ast*–3 and *cet*–5 and air dry start and stop switches provide for manual control of the timer AST. The contacts *aur*–10 have no effect on the automatic operation of the device but permit overriding of the timer AST during manual operation.

Energization of the relay AST opens the normally closed contacts *ast*–1 to de-energize the brush motor drive 81 and the brush in contact solenoid to cause the brushes 73 and 75 to be retracted from the disc 31. Because of the delay provided in the closure of the contacts *ast*–4, the brushes 73 and 75 are retracted prior to the time air begins flowing through the nozzles 113. The disc drive motor 57 continues to rotate the disc 31 and the contacts *ast*–5 open to extinguish the indicator light R–6.

After only a short period of delay provided for by the delayed closure of the contacts *ast*–6 an air duration timer ADT is energized through the contacts *aur*–11. This causes opening of the normally closed contacts *adt*–2 to de-energize the solvent pump motor to thereby stop the flow of solvent to the disc 31. This also occurs prior to our simultaneously with the beginning of air flow to the disc.

The drying cycle continues with air being directed against the disc 31 which is being rotated by the disc drive motor 57. After a predetermined delay period the normally closed contacts *adt*–1 open to de-energize the disc drive motor 57.

Next, the normally open contacts *adt*–3 are closed to energize a cycle end timer CET. This causes the normally closed contacts *cet*–4 to open to de-energize the work cycle timer WCT. This in turn causes the contacts *wct*–4 to open to de-energize the air dry start solenoid to stop the flow of air to the disc.

After a short delay provided by the delayed opening of the contacts *cet*–3, the disc clamp solenoid is de-energized and the disc unclamp solenoid is energized to cause the clamping roller 41 to be retracted from the disc 31. Energization of the cycle end timer CET also opens the contacts *cet*–2 to de-energize the cover timer CVT. This in turn causes the contacts *cvt*–2 to return to their normally closed position to reverse the potential across the motor 151 to cause the door 15 to be opened.

Finaly, the contacts *cet*–1 open to de-energize the relay AUR. The master start relay MR is still energized through the holding circuit established by the contacts *mr*–1. Thus, the motor 151 is energized to maintain the door 15 in the open position and the disc unclamp solenoid is energized to maintain the clamping roller 41 in the retracted position. The cycle can be repeated by merely loading another disc into the cleaning chamber 27 and depressing the automatic start switch. The manual switches described above are used primarily for setup, but can be used, for example, when it is desired to vary the cycle times for a particular disc. The motors 57, 81 and 151 are preferably of the conventional "dead stall" type so that they can remain energized against an immovable load without causing damage thereto.

It should be understood that other arrangements of controls for the cleaning apparatus may be employed. However, the control system illustrated in FIGS. 9 and 10 is preferred because it utilizes a minimum number of relays.

Although an exemplary embodiment of the invention has been shown and described, many changes, modifications, and substitutions may be made by one having ordinary skill in the art without necessarily departing from the spirit and scope of this invention.

What is claimed is:

1. In a method of cleaning a memory disc having at least one recording face and an outer periphery, the steps of:

- providing at least first and second mounting members mounted on a supporting structure;
- supporting the memory disc by engaging the outer periphery of the disc with the mounting members to thereby substantially expose all portions of said one face of the disc;
- rotating the disc relative to the mounting members to sequentially expose all portions of said one face of the disc;
- directing a stream of solvent against the disc so that the solvent contacts the face thereof;
- engaging said one face of the disc wth a scouring member; and
- rotating the scouring member about an axis extending generally radially of the disc while the disc is rotating and while the scouring member engages said one face of the disc to scour all of the portions of such face of the disc.

2. A method as defined in claim 1 including moving the scouring member generally along said axis at least until the scouring member is out of contact with said one face of the disc and then directing a drying fluid against said one face of the disc to dry the disc whereby solvent remaining on the scouring member cannot retard the drying of the one face of the disc.

3. A method as defined in claim 1 wherein the memory disc is supported in a generally vertical plane and the stream of solvent is directed against the disc above the scouring member, said axis about which the scouring member rotates is generally horizontal, the rotation of the scouring member about said axis being in a direction so that the region of the scouring member contacting the disc moves downwardly to sweep downwardly the material washed from the disc.

4. In a method of cleaning a memory disc having opposed recording faces and an outer periphery, the steps of:

- supporting the memory disc on a supporting structure for rotation relative thereto and to substantially expose all portions of the faces of the disc;
- rotating the disc relative to the supporting structure about a rotational axis which is generally transverse to the faces of the disc;
- directing a stream of solvent against the disc so that the solvent contacts the faces thereof;
- engaging the faces of the disc with first and second scouring members, respectively, while the disc is rotating to thoroughly and simultaneously clean both faces of the disc;
- moving the first and second scouring members along first and second paths, respectively, at least until the scouring members are out of contact with the faces of the disc, each of said paths extending generally transverse to the rotational axis; and
- drying the faces of the disc subsequent to said steps of moving.

5. In a device for cleaning a generally annular member with a solvent wherein the annular member has opposed faces and a peripheral edge, the combination of:

- a supporting structure;
- a plurality of mounting members mounted on said supporting structure for mounting the annular member for rotation with the faces thereof exposed;
- means for rotating the annular member relative to the supporting structure;
- a cleaning member engageable with a face of the annular member for cleaning such face thereof;
- track means mounted on the supporting structure in a direction to permit movement therealong toward and away from the annular member linearly in a path extending generally transverse to the rotational axis of said annular member when the annular member is mounted on the mounting members;
- a carriage supportable by said track means and movable therealong;
- means for mounting the cleaning member on the carriage for movement therewith, said cleaning member being movable by the carriage into and out of engagement with the face of the annular member;
- means for moving the carriage in both directions along said track to selectively move the cleaning member into and out of engagement with the face of the annular member;
- means for directing a stream of the solvent against the annular member to allow said cleaning member to clean the faces of the annular member; and
- means for stopping the flow of solvent against the annular member.

6. A combination as defined in claim 5 wherein said supporting structure includes a wall defining a substantially sealed cleaning chamber having said mounting members and said cleaning member mounted therein, said track means and said carriage means being mounted outside of the cleaning chamber, said means for mounting the cleaning member on the carriage extending through the wall of the cleaning chamber, and said carriage moving the cleaning member generally linearly relative to the annular member to thereby minimize the size of opening required in the wall of the cleaning chamber to accommodate the means for mounting the cleaning member.

7. A combination as defined in claim 5 including motor means mounted on said carriage for rotating said cleaning member.

8. A combination as defined in claim 7 wherein said cleaning member includes a brush, said motor means rotates said brush about an axis which extends generally radially of the annular member, and said brush is moved by said carriage along a path which extends generally radially relative to the annular member.

9. In a device for cleaning a memory disc wherein the disc has opposed faces and a peripheral edge, the combination of:

a housing including wall means in said housing for dividing the housing into an equipment chamber and a tightly sealable cleaning chamber, said housing having an upwardly facing opening for providing access to the cleaning chamber and movable door means for selectively opening and tightly closing said opening;

at least first and second mounting members in said cleaning chamber for mounting the disc for rotation in a generally upright position with the faces thereof at least substantially exposed, said mounting members being engageable with the outer periphery of the disc, one of said mounting members being engageable with the peripheral edge of the disc above the center of the disc and beneath said opening;

means at least partially in the equipment chamber and extending through said wall means for mounting said one mounting member for generally linear movement toward and away from the disc periphery whereby retraction of said one mounting member frees the disc for movement upwardly through said upwardly facing opening;

means in said equipment chamber for moving the mounting member generally toward and away from the disc periphery;

a disc drive motor in said equipment chamber;

means extending through said wall means for drivingly connecting the disc drive motor and the first mounting member to rotate the first mounting member and the disc;

a scouring member mounted in said cleaning chamber;

means extending through said wall means for mounting said scouring member for movement generally linearly toward and away from the disc; and means in the equipment chamber for moving the scouring member linearly toward and away from the disc in a path extending generally transverse to the rotational axis of said disc.

10. A combination as defined in claim 9 including a scouring member drive motor mounted in said equipment chamber and drivingly connected to said means for mounting said scouring member to rotate said scouring member relative to the housing.

11. A combination as defined in claim 9 including a pair of tracks lying respectively along opposed edges of the opening, said door being positioned between said tracks; sealing means forming a tight seal along the longitudinal edges of said tracks, a plurality of rollers mounted for rolling movement along said tracks; and means for securing one of said housing and said door to said tracks and the other of said housing and said door to said rollers whereby said door can be moved to open and close said opening.

12. A combination as defined in claim 9 wherein said door is mounted for generally linear movement between an open and closed position and including motor means for moving said door between said positions thereof.

13. In a device for cleaning a memory disc having opposed faces and a periphery, the combination of:

a housing having a cleaning chamber, said cleaning chamber having an opening providing access thereto from the exterior of said housing;

mounting means engageable with a portion of the periphery of the disc for mounting the disc within the cleaning chamber for rotation about a first rotational axis;

mechanical means engageable with both faces of the disc for substantially simultaneously cleaning the faces thereof, said mechanical means including first and second brushes, each of said brushes being generally cylindrical with the longitudinal axis thereof being generally transverse said first rotational axis of the disc;

brush rotating means for rotating each of said brushes about its respective longitudinal axis;

means for mounting said brushes for movement into and out of engagement with the disc along parallel paths coincident with their respective longitudinal axes;

means for automatically moving said brushes as a unit into engagement with the disc for a predetermined period;

means for automatically retracting said brushes as a unit from the disc at the expiration of said predetermined period;

drive means for rotating the disc about the first rotational axis relative to said brushes and relative to said mounting means; and nozzle means within said housing for directing a solvent against the disc.

References Cited

UNITED STATES PATENTS

| | | | |
|---|---|---|---|
| 1,753,176 | 4/1930 | Stevens | 15—308 XR |
| 2,629,343 | 2/1953 | Rose | 15—308 XR |
| 2,837,759 | 6/1958 | Haverberg | 15—302 |
| 2,976,551 | 3/1961 | Watts | 15—4 |
| 3,005,223 | 10/1961 | Taylor et al. | 15—394 XR |
| 3,060,477 | 10/1962 | Wechsler | 15—306 XR |
| 3,077,622 | 2/1963 | Murphy | 15—306 XR |
| 3,108,299 | 10/1963 | Baldwin | 134—123 XR |
| 3,150,401 | 9/1964 | Taylor et al. | 15—311 |
| 3,327,721 | 6/1967 | Carlson | 134—153 XR |
| 3,345,075 | 10/1967 | Phillipson | 134—33 XR |

MORRIS O. WOLK, Primary Examiner

J. T. ZATARGA, Assistant Examiner

U.S. Cl. X.R.

134—6, 153, 199; 15—4, 21, 302